(No Model.)
A. C. MARTIN.
CAR COUPLING.
No. 472,581.  Patented Apr. 12, 1892.
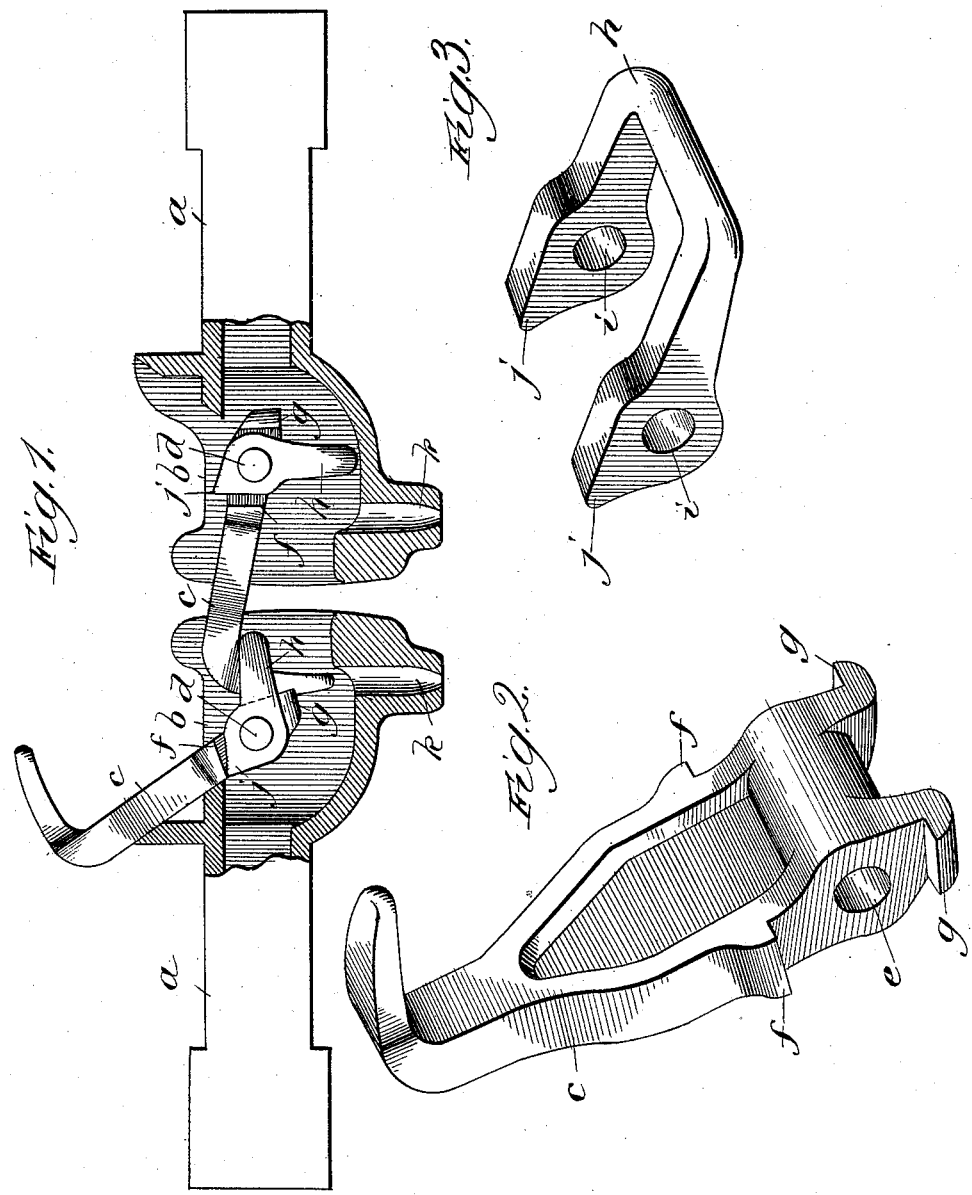
Witnesses:
Chas. E. Gaylord,
E. Fletcher.
Inventor:
Alexander C. Martin,
By David H. Fletcher
Atty.

UNITED STATES PATENT OFFICE.

ALEXANDER C. MARTIN, OF CHICAGO, ILLINOIS.

CAR-COUPLING.

SPECIFICATION forming part of Letters Patent No. 472,581, dated April 12, 1892.

Application filed June 25, 1891. Serial No. 397,488. (No model.)

*To all whom it may concern:*

Be it known that I, ALEXANDER C. MARTIN, of Chicago, in the county of Cook and State of Illinois, have invented certain new and useful Improvements in Car-Couplers, of which the following is a full, clear, and exact description, reference being had to the accompanying drawings, forming a part of this specification, in which—

Figure 1 is a side view, partly in longitudinal section, of a car-coupler embodying the features of my invention. Fig. 2 is a perspective view in detail of the hook employed therein, and Fig. 3 is a like view of the loop or link with which the hook in the opposite draw-bar head is intended to engage.

Corresponding letters of reference in the different figures indicate like parts.

My invention consists in an improvement upon Letters Patent No. 436,796, issued to me on the 23d day of September, 1890, for an improvement in car-couplers; and my object is to so form the elbow-shaped coupler described in said patent that the loop or link upon the short end of the elbow may have a limited movement independently of the hook, while at the same time the weight of the hook when thrown back may serve to support the loop in position to receive the hook of the opposite draw-head. I accomplish said object in the manner hereinafter more particularly described, and definitely pointed out in the claims.

Referring to the drawings, $a$ represents the draw-bars of my improved coupler, integral with which are the draw-bar heads $b\,b$, which are open at the top to permit the hooks $c$ to be thrown back, as clearly shown at the left in Fig. 1. The hook $c$ is pivoted in the draw-bar head upon a pin $d$, which passes loosely through bores in the sides of said head, and also through a bore $e$ in the body of said hook. Said hook is provided with shoulders $f\,f$ and $g\,g$, which are adapted to fit loosely between the inner faces of the head $b$. A U-shaped link or loop $h$, provided with bores $i\,i$, is loosely mounted upon the pin $d$, the prongs of said loop being arranged to straddle the body of the hook and rest in the space between the lugs $f\,g$. Projections or shoulders upon said loop are arranged to engage with the shoulders $f\,f$ upon said hook, while the lugs $g$ also engage with the body of said loop, and thereby serve when the hook is thrown back, as shown at the left in Fig. 1, to sustain said loop in a horizontal or substantially horizontal position. The advantage of thus jointing the loop, instead of making it integral with the body of the hook, is to enable said link to have a free play in case the line of draft from the hook with which it is engaged is more or less upward, as often occurs when one draw-head is higher than the other, thereby relieving the link from a prying strain which might cause it to break. By forming sockets $k$ in the bottom of the head, the usual link and pin may be employed, if desired, the upper part of the pin being sustained by means of the loop $h$. When the hook is down, it is manifest that the loop $h$ would hang down loosely, as shown at the right in Fig. 1. It is obvious that either the shoulders $f$ or $g$ would serve to hold the loop in an extended position; but I prefer to employ both.

Having thus described my invention, I claim—

1. The combination, with a draw-bar head, of the hook $c$ and link $h$, mounted upon a common pin, the hook being rigid with the pin and the loop loosely mounted thereon, and means for permitting a limited oscillatory movement of said loop independently of the hook, substantially as shown and described.

2. The combination, with the opposite draw-heads of railway-cars, of a hook and loop mounted upon a common pin in each of said draw-heads, said hook and loop being jointedly connected with each other, whereby a limited movement of the loop is permitted independently of the hook and said loop sustained in a horizontal position when the hook is thrown back, substantially as shown and described.

In testimony whereof I have signed this specification, in the presence of two subscribing witnesses, this 18th day of June, 1891.

ALEXANDER C. MARTIN.

Witnesses:
D. H. FLETCHER,
JOS. BINGHAM.